(12) United States Patent
Hsu

(10) Patent No.: US 8,308,124 B2
(45) Date of Patent: Nov. 13, 2012

(54) CONTROL DEVICE FOR ADJUSTABLE BICYCLE SEAT

(76) Inventor: Jung Yu Hsu, Tainan (TW)

( * ) Notice: Subject to any disclaimer, the term of this patent is extended or adjusted under 35 U.S.C. 154(b) by 89 days.

(21) Appl. No.: 12/914,605

(22) Filed: Oct. 28, 2010

(65) Prior Publication Data

US 2012/0104809 A1     May 3, 2012

(51) Int. Cl.
*F16M 11/00* (2006.01)

(52) U.S. Cl. .............. 248/599; 248/161; 403/109.1; 297/215.13; 297/344.19

(58) Field of Classification Search .......... 248/599, 248/161; 403/109.1; 297/215.13, 344.19; 91/437
See application file for complete search history.

(56) References Cited

U.S. PATENT DOCUMENTS

| | | | | |
|---|---|---|---|---|
| 3,381,926 A | * | 5/1968 | Fritz et al. | 248/404 |
| 4,061,304 A | * | 12/1977 | Schattmaier | 248/404 |
| 4,108,416 A | * | 8/1978 | Nagase et al. | 248/566 |
| 4,415,135 A | * | 11/1983 | French | 248/161 |
| 4,807,856 A | * | 2/1989 | Teckenbrock | 267/132 |
| 5,263,674 A | * | 11/1993 | Huang | 248/161 |
| 5,344,170 A | * | 9/1994 | Ochoa | 280/283 |
| 5,366,275 A | * | 11/1994 | Sulzer | 297/344.19 |
| 5,829,733 A | * | 11/1998 | Becker | 248/631 |
| 5,857,657 A | * | 1/1999 | Yamamoto | 248/406.1 |
| 5,979,845 A | * | 11/1999 | Battey et al. | 248/161 |
| 6,276,756 B1 | * | 8/2001 | Cho et al. | 297/344.19 |
| 7,007,587 B2 | * | 3/2006 | Zanden | 91/437 |
| 7,017,872 B2 | * | 3/2006 | Hogle et al. | 248/162.1 |
| 7,306,206 B2 | * | 12/2007 | Turner | 267/64.12 |
| 7,422,224 B2 | * | 9/2008 | Sicz et al. | 280/274 |
| 7,673,936 B2 | * | 3/2010 | Hsu | 297/215.13 |
| 7,721,640 B2 | * | 5/2010 | Lee | 91/437 |
| 8,079,772 B1 | * | 12/2011 | Brennan et al. | 403/109.1 |
| 8,136,877 B2 | * | 3/2012 | Walsh | 297/215.13 |
| 8,191,964 B2 | * | 6/2012 | Hsu | 297/215.13 |
| 2010/0308628 A1 | * | 12/2010 | Hsu | 297/215.14 |
| 2011/0097139 A1 | * | 4/2011 | Hsu | 403/109.1 |
| 2012/0049427 A1 | * | 3/2012 | Hsu | 267/217 |

* cited by examiner

*Primary Examiner* — Terrell McKinnon
*Assistant Examiner* — Daniel J Breslin
(74) *Attorney, Agent, or Firm* — Rosenberg, Klein & Lee

(57) ABSTRACT

A bicycle seat adjustable device includes an outer tube and an inner tube inserted into the outer tube. A piston seat and a clamp unit are connected to the inner tube. A valve unit extends through the piston seat and is located in the inner tube. The valve unit includes a rod extending through the piston seat and reaches the bottom end of the outer tube. A control unit has a control unit connected to the bottom end of the outer tube and an action unit is located outside of the outer tube. The control unit has a push member connected with the rod. The action unit has a cable extending through the outer tube and connected to the push member. A switch is connected to the cable. The push member is indirectly moved to move the rod to control the hydraulic path in the piston seat by pulling the cable.

14 Claims, 17 Drawing Sheets

CONTROL DEVICE FOR ADJUSTABLE BICYCLE SEAT

FIELD OF THE INVENTION

The present invention relates to a control device, and more particularly, to a control device using hydraulic and/or pneumatic means to control the hydraulic paths of the control device to adjust the height of the bicycle seat.

BACKGROUND OF THE INVENTION

The proper height of the bicycle seat for the cyclist is crucial for protecting the cyclist from being injured during operation the bicycle and also for obtaining maximum efficiency of the operation of the bicycle. The adjustable bicycle seat is a trend for most of the bicycles when considering the cost of custom-made bicycle frames.

The existed bicycle seat adjustable devices use an adjustable mechanism located between the seat post and the seat tube so as to control the linear movement between the seat post and the seat tube. The conventional seat adjustable devices generally include mechanical adjustable devices, hydraulic/pneumatic adjustable devices, and hybrid adjustable devices which uses air and hydraulic media to adjust the seat. The mechanical adjustable devices use mechanical parts to set the relative height between the seat and the seat tube. The hydraulic/pneumatic adjustable devices use hydraulic media such as oil or air to achieve the purposes of adjustment of the seat. The hybrid adjustable devices utilize both of the air and hydraulic oil to adjust the height of the seat relative to the seat tube.

Each of the mechanical adjustable devices, hydraulic/pneumatic adjustable devices, and hybrid adjustable devices has a control unit so as to activate the adjustable device to allow the seat to be movable relative to the seat tube, when the seat is adjusted to a desired height, the control unit is locked to set the height of the seat. The control unit can be connected to the seat tube or the seat post directly so as to control the adjustable device. Alternatively, the control unit can be connected to any position of the bicycle frame other than the seat post and the seat tube.

One of the seat adjustable devices is disclosed in U.S. Pat. No. 7,083,180 and comprises a control unit located in the seat tube and the user can pivot a lever to push the rod in the adjustable device to seal or open the oil paths in the seat post and the seat tube so as to adjust the position of the seat.

Another adjustable device is disclosed in Taiwan Utility Patent Application No. 097223637 and comprises an inner tube which has an axial adjustment slot with two inclined insides, multiple holes are located at the bottom of the slot. An outer tube is mounted to the inner tube which is movable linearly relative to the outer tube. A cap seals the bottom of the outer tube and has a position rod extending into the outer tube. A spring is located in the outer tube and has one end extending through the positioning rod and the other end of the spring contacts the inner tube. An action unit extends through the outer tube and the slot, and includes a positioning member which is engaged with one of the holes. The positioning member has inclined surfaces which are matched with the inclined insides of the slot so that the positioning member is movable in the radial direction to control the relative position between the inner and outer tubes.

Yet another adjustable device is disclosed in Taiwan Utility Patent Application No. 094204651 and comprises a rise device and a control device, wherein the rise device has a spring and a locking member located in the recess of the seat tube. The locking member has a block and a passage, multiple hard sleeves, soft sleeves, washers and a base connected to the seat post. The base has protrusions on the periphery thereof to form a connection space. A washer, a locking member and a rod are located in the connection space. The control device has a lever and a cable which is fixed to a board by the locking member. The connection space of the seat tube has a closed end and the cable extends through the seat post. A flange extends from a mediate portion of the seat post and multiple blocks are connected to the lower end of the seat post to form connection slots.

The first two prior adjustable devices provide the switch close to the seat tube or the seat post, wherein the switch of the first adjustable device is directly connected to the rod so as to control the linear movement of the seat post and is suitable cooperated with the hydraulic/pneumatic adjustable devices. The second adjustable device provides an engaging device located between the seat post and the seat tube and has multiple holes located axially such that the positioning member is engaged with one of the holes to seat the height. The third adjustable device provides the lever outside of the seat post and the seat tube, and the user can operate the lever. The rise device is connected with a cable which activates the action of adjustment.

However, the hydraulic/pneumatic adjustment devices are restricted by the position of the rod so that the rod has to be connected to the related hydraulic/pneumatic parts. The rod extends downward from the post tube to the valve unit so that the most of the parts are located on the top section of the seat tube and the action unit is located close to the clamp unit. If the rod extends upward from the seat tube and is connected to the valve unit, the action unit has to be located at the lower portion so as to be connected to the rod and control the movement of the rod.

SUMMARY OF THE INVENTION

The present invention relates to a bicycle seat adjustable device and comprises an outer tube which is a hollow tube and has a top end and a bottom end. An inner tube is a hollow tube and inserted into the outer tube via the top end of the out tube. The inner tube has a piston seat and a clamp unit on two ends thereof. A valve unit extends through the piston seat and is located in the inner tube. The valve unit comprises a rod extending through the piston seat and reaches the bottom end so as to control hydraulic path in the piston seat. A control unit has a control unit connected to the bottom end of the outer tube and an action unit is located outside of the outer tube. The control unit has a push member connected with the rod so as to move the rod linearly. The action unit has a cable which extends through the outer tube and is connected to the push member. A distal end of the cable is connected to a switch. The push member is indirectly moved so as to move the rod to control the hydraulic path in the piston seat by pulling the cable. The inner tube is movable relative to the outer tube so as to set the height of the bicycle seat. The action unit is not restricted by the position of the rod and the switch can be installed to any position of the bicycle frame.

The primary object of the present invention is to provide a bicycle seat adjustable device which is used for the hydraulic/pneumatic adjustable device, wherein the rod of the valve unit extends upward in the seat tube. The action unit is located outside of the seat tube such that the action unit is not restricted by the position of the rod and the switch can be installed to any position of the bicycle frame.

The secondary object of the present invention is to provide a bicycle seat adjustable device wherein the control unit is composed of two parts and is connected to the control unit and the rod located at the outer tube or the seat tube. The action unit is located out side of the seat tube and cooperated with a cable. The device includes less number of parts and can be easily and quickly assembled.

The third object of the present invention is to provide a bicycle seat adjustable device wherein the positioning unit is connected to the outer tube or the seat tube and the cable is wrapped to the positioning unit such that the cable does not shift or loosened.

The fourth object of the present invention is to provide a bicycle seat adjustable device wherein the action unit and the control unit are used for the hydraulic/pneumatic adjustable device, so that the action unit and the control unit can be used with mechanical adjustable device, hydraulic/pneumatic adjustable devices and electro-magnetic adjustable devices.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
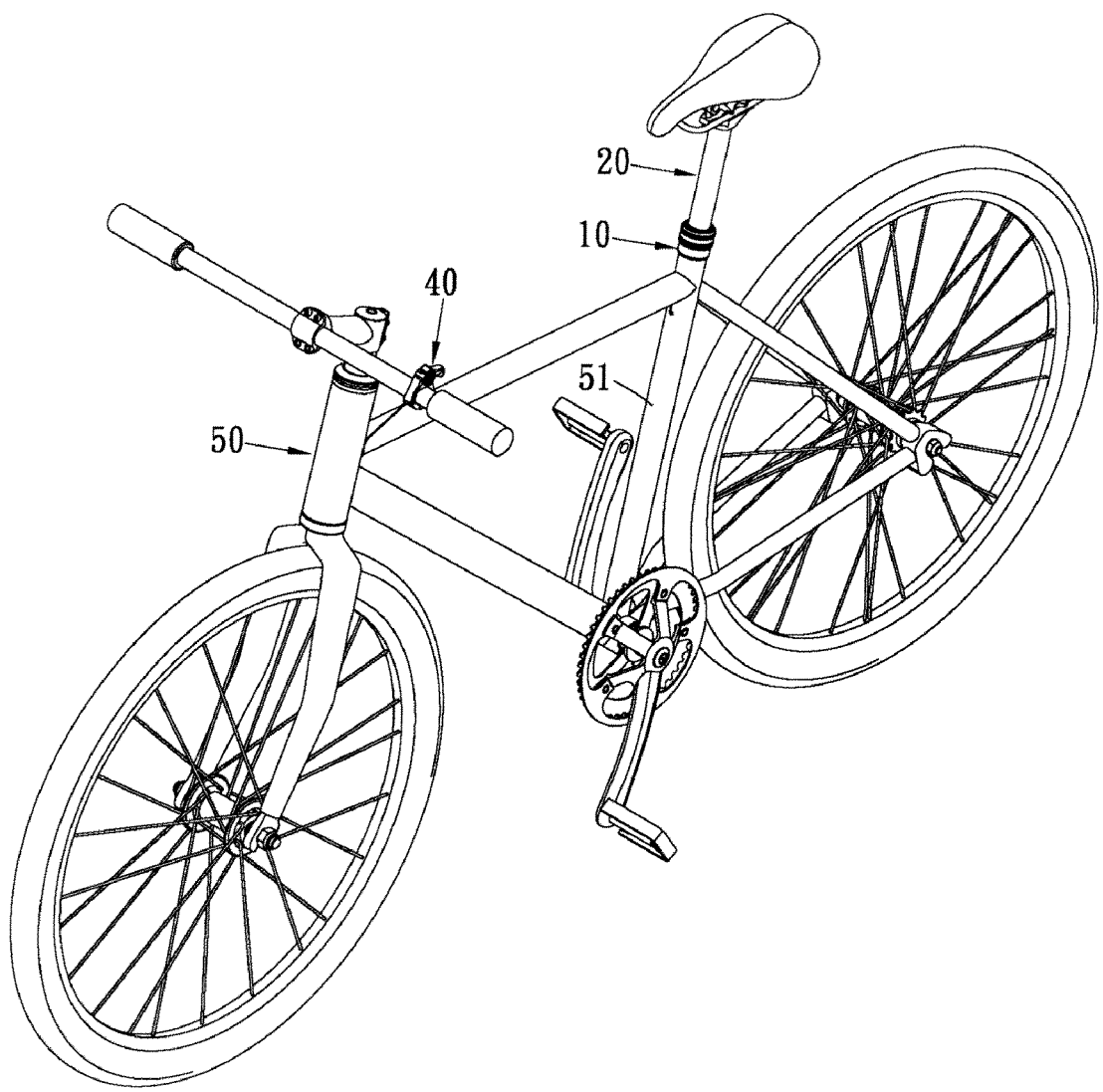
FIG. 1 is a perspective view to show the bicycle seat adjustable device of the present invention is installed to a bicycle.
Figure 2:
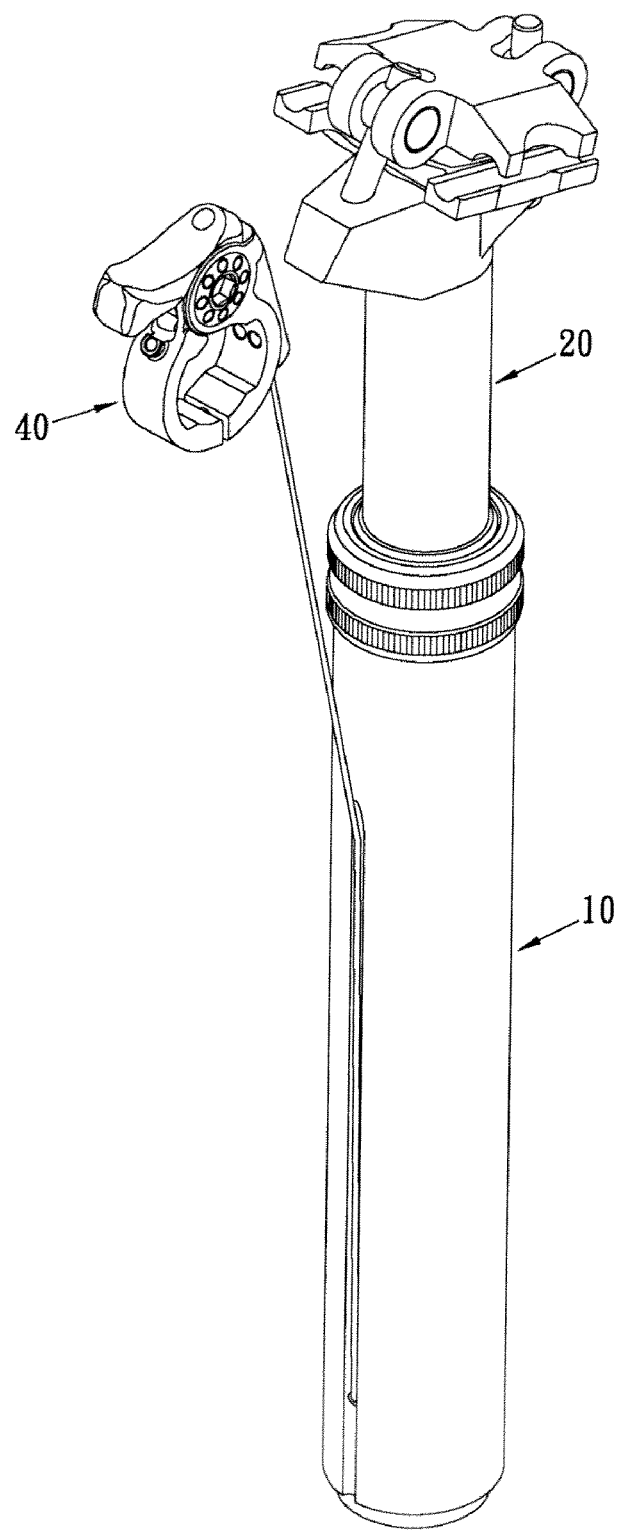
FIG. 2 is a perspective view to show the bicycle seat adjustable device of the present invention.
Figure 3:
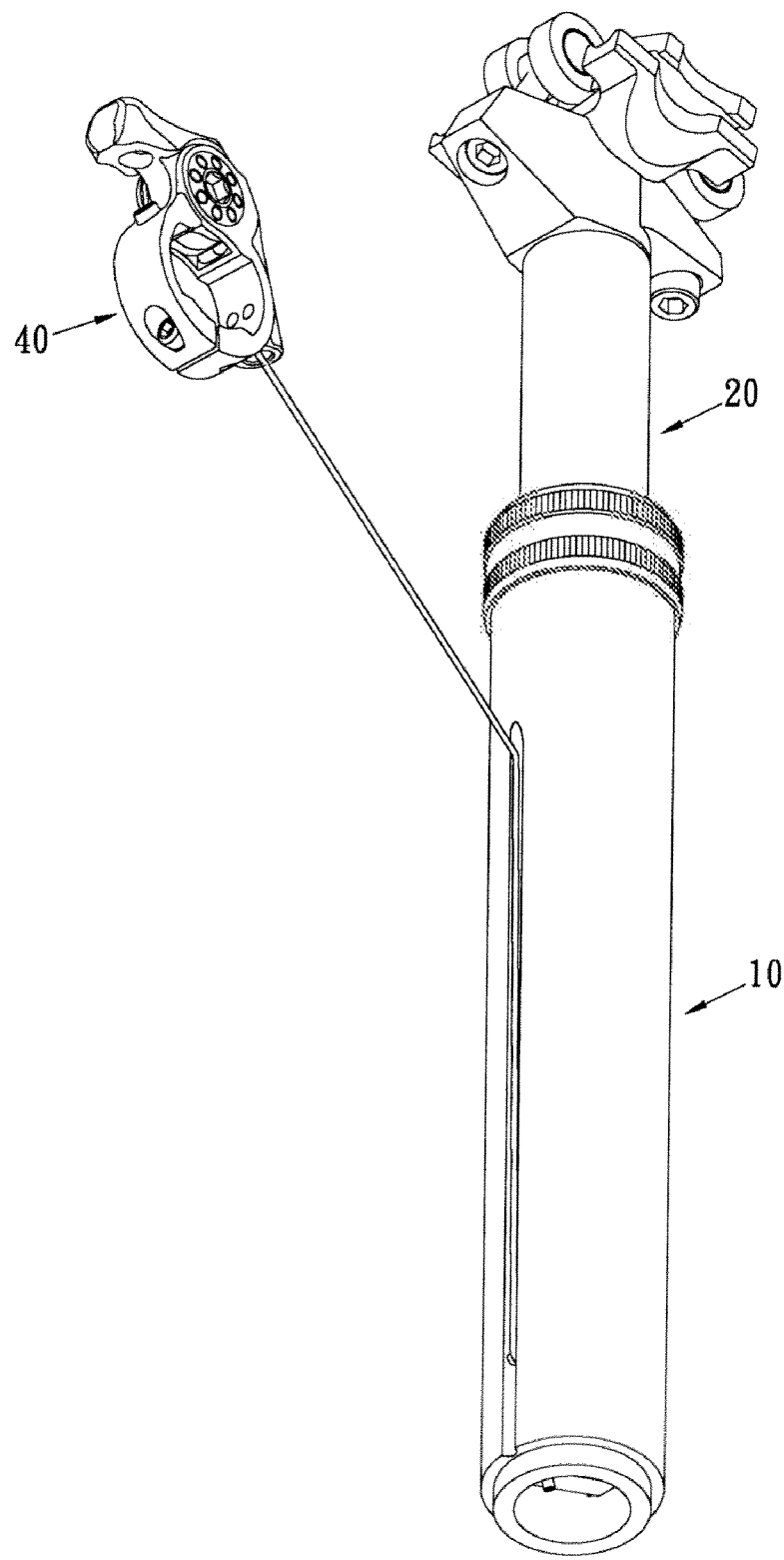
FIG. 3 is another perspective view to show the bicycle seat adjustable device of the present invention.
Figure 4:
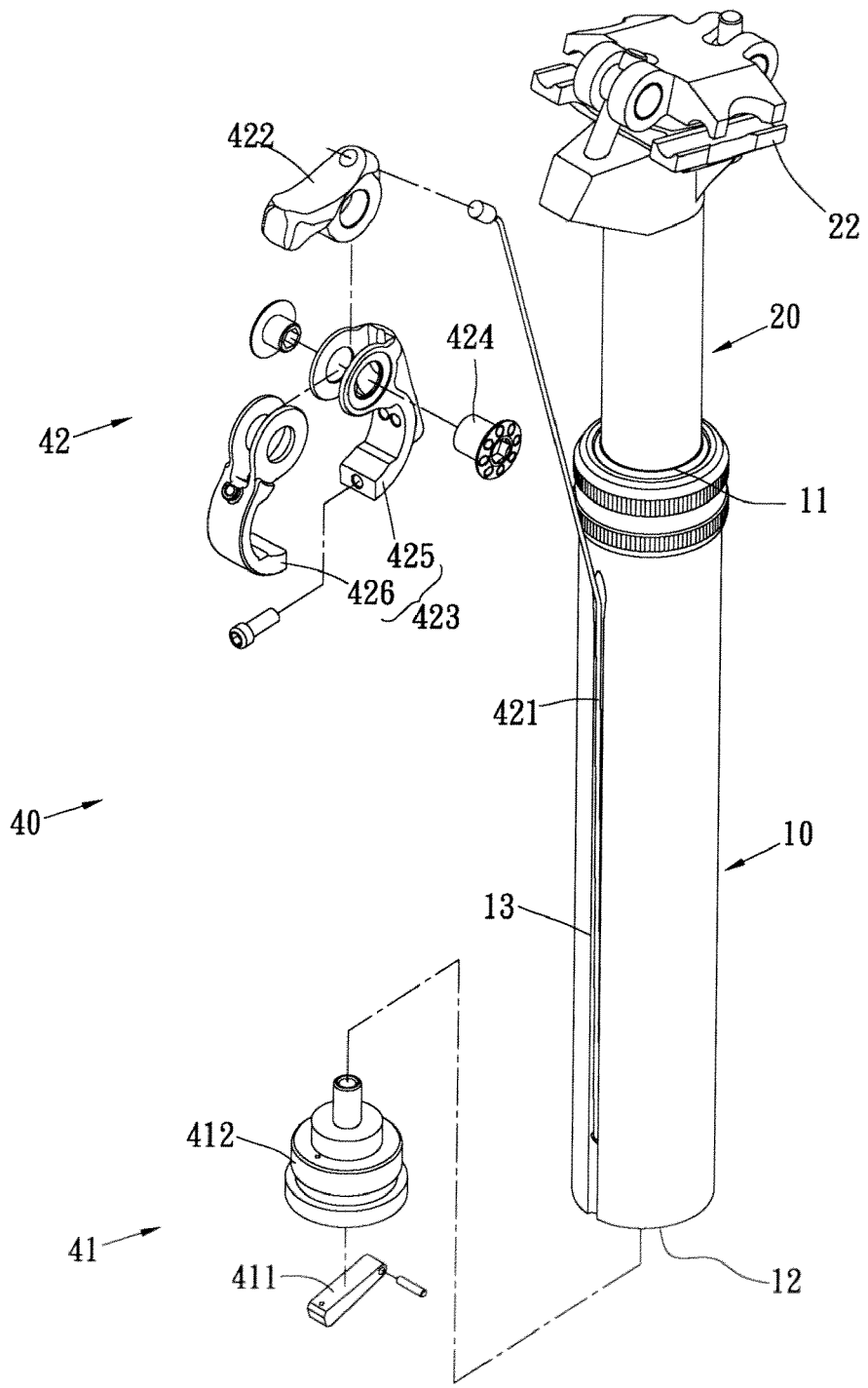
FIG. 4 is an exploded view to show the bicycle seat adjustable device of the present invention.
Figure 5:
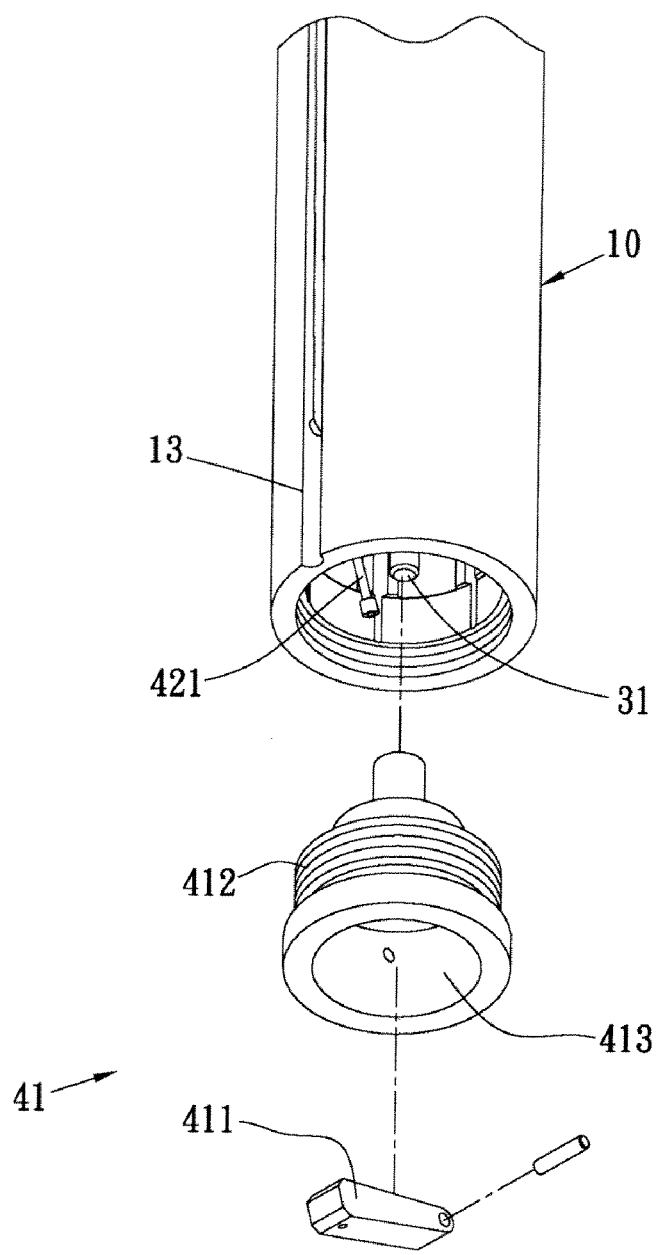
FIG. 5 is an exploded view to show the control unit of the bicycle seat adjustable device of the present invention.
Figure 6:
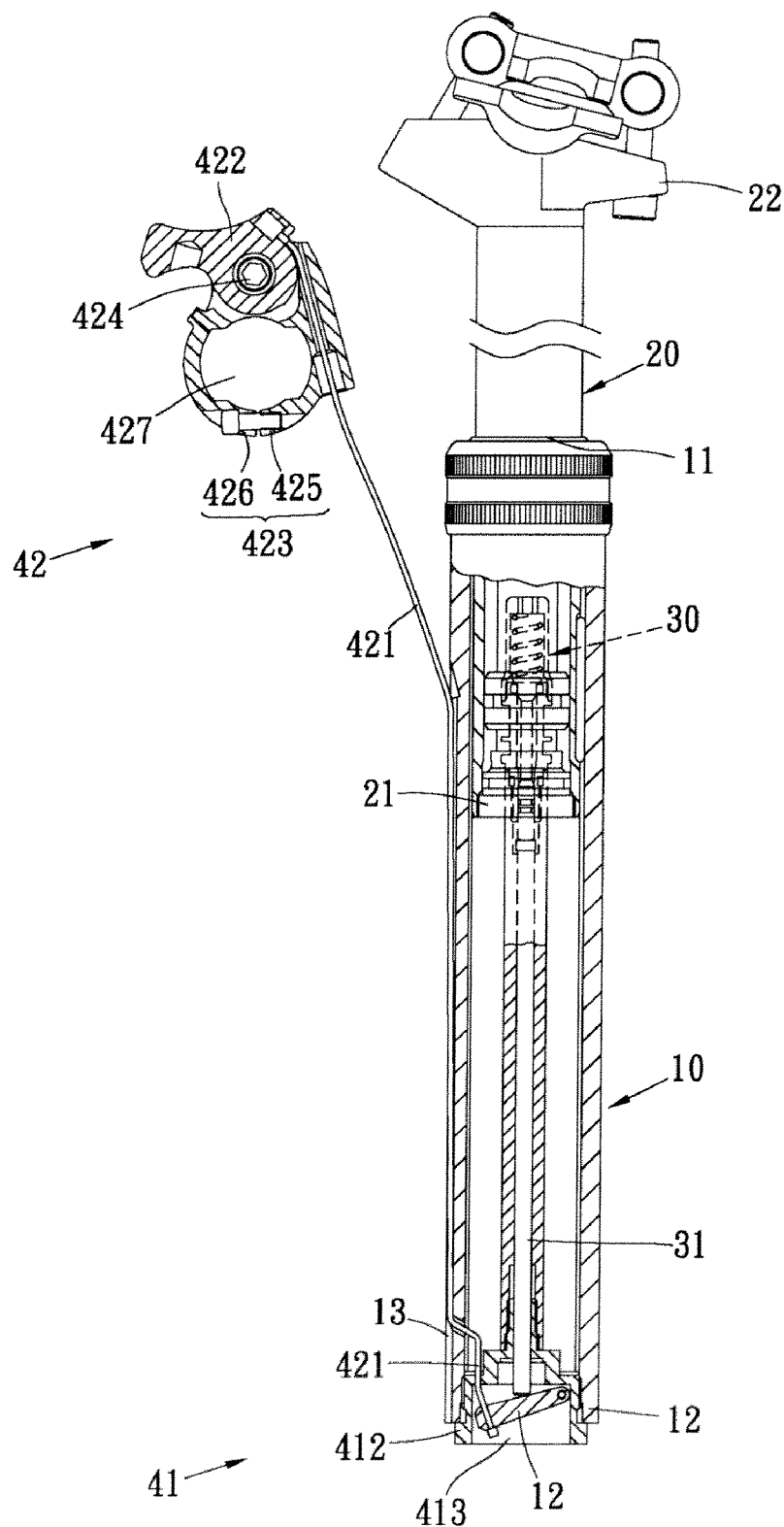
FIG. 6 is a cross sectional view of the bicycle seat adjustable device of the present invention.

Referring to FIGS. 1 to 6, the bicycle seat adjustable device of the present invention is installed in the seat tube 51 of a bicycle frame 50 and comprises an outer tube 10 in which an inner tube 20 is located. A valve unit 30 is located in the inner tube 20 and control assembly 40 is connected to the handlebar 52 of the bicycle frame 50.

The outer tube 10 is a hollow tube and has a top end 11 and a bottom end 12 on two ends thereof. The outer tube has a slot 13 defined axially in outer surface thereof.

The inner tube 20 is a hollow tube which is inserted into the outer tube 10 via the top end 11 of the out tube 10. The inner tube 20 has a piston seat 21 and a clamp unit 22 are connected on two ends thereof.

The valve unit 30 extends through the piston seat 21 and located in the inner tube 20. The valve unit 30 comprises a rod 31 extending through the piston seat 21 and reaches the bottom end 12 so as to control hydraulic path in the piston seat 21.

The control assembly 40 has a control unit 41 connected to the bottom end 12 of the outer tube 10 and an action unit 42 which is located outside of the outer tube 10. The control unit 41 has a push member 411 connected with the rod 31 so as to move the rod 31 linearly. The action unit 42 has a cable 421 which extends through the outer tube 10 and is connected to the push member 411. A distal end of the cable 421 is connected to a switch 422. The push member 411 is indirectly moved so as to move the rod 31 to control the hydraulic path in the piston seat 21 by pulling the cable 421.

The action unit 42 has a securing init 423 which comprises a pin 424 and two parts 425, 426. The two parts 425, 426 form a clamping space 427 so as to be connected to the bicycle frame, such as the handlebar 52. The switch 422 is pivotably connected to the two parts 425, 426. The control unit 41 has a frame 412 fixed in the bottom end 12 and the frame 412 has a space 413. The rod 31 extends through the frame 412 and is inserted into the space 413. The push member 411 is an elongate rod and pivotably connected to the space 413 and pivotable in the space 413. The cable 421 extends through the outer tube 10 and the frame 412 and is located in the space 413 and connected to the push member 411.

By the action unit 42 located outside of the bicycle frame 50, the user pulls the cable 421 to indirectly move the push member 411 to move the rod 31 linearly and control the hydraulic path in the piston seat 21. Therefore, the inner tube 20 is movable relative to the outer tube 10. The action unit 42 is not restricted by the position of the rod 31 so that the action unit 42 can be installed to any position of the bicycle frame 50.

When in assembling, the piston seat 21 and the clamp unit 22 are connected to the two ends of the inner tube 20, and the piston seat 21 leads the inner tube 20 into the outer tube 10. The valve unit 30 extends into the piston seat 21 and one end of the rod 31 extends into the piston seat 21 and the other end of the rod 31 extends toward the bottom end 12. The push member 411 is pivotably connected to the space 413 of the frame 412, the frame 412 is fixed in the bottom end 12 and the rod 31 extends into the space 413. The two parts 415, 426 and the switch 422 are pivotably connected to each other by the pin 424 so as to form the clamping space 427. The cable 421 has one end extending into the space 413 and fixed to the push member 411. The other end of the cable 421 extends through the slot 13 of the outer tube 10.

Figure 7:
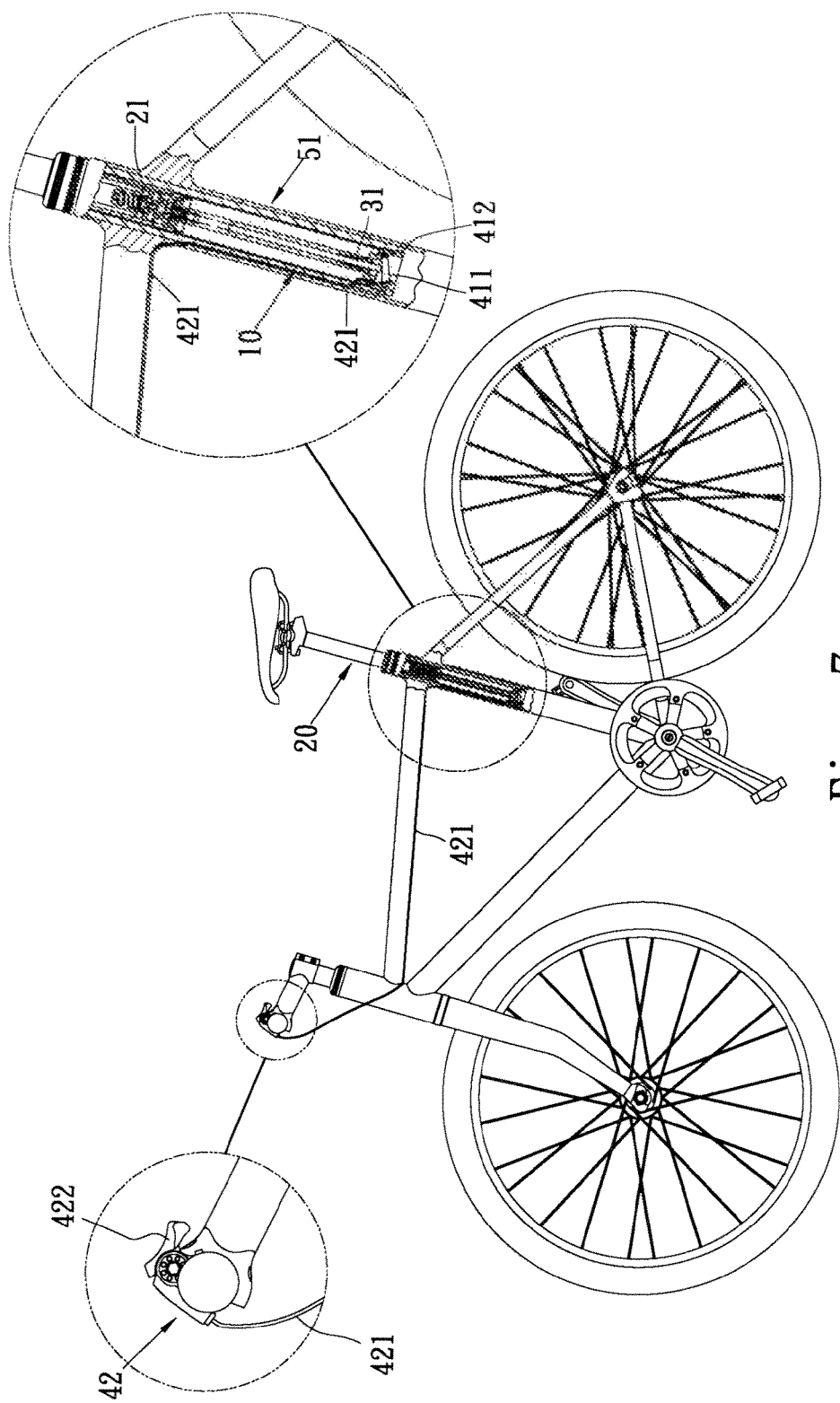
FIG. 7 shows a side view to show that the bicycle seat adjustable device of the present invention installed to a bicycle.

As shown in FIG. 7, the clamping space 427 is mounted to the handlebar 52 of the bicycle frame 52 and the outer tube 10, the inner tube 20, the valve unit 30 and the control assembly 40 are installed in the seat tube 51. The cable 421 extends through the seat tube 51 and is exposed from the bicycle frame 50. The cable 421 extends toward the action unit 42 and is wrapped to a desired position of the bicycle frame 50. Finally, the cable 421 extends through the part 425 and is connected to the switch 422.

It is noted that the action unit 42 can be installed to any position of the bicycle frame 50 such as the handlebar 52, the head tube, the top tube, the down tube and the seat tube 51.

Figure 8:
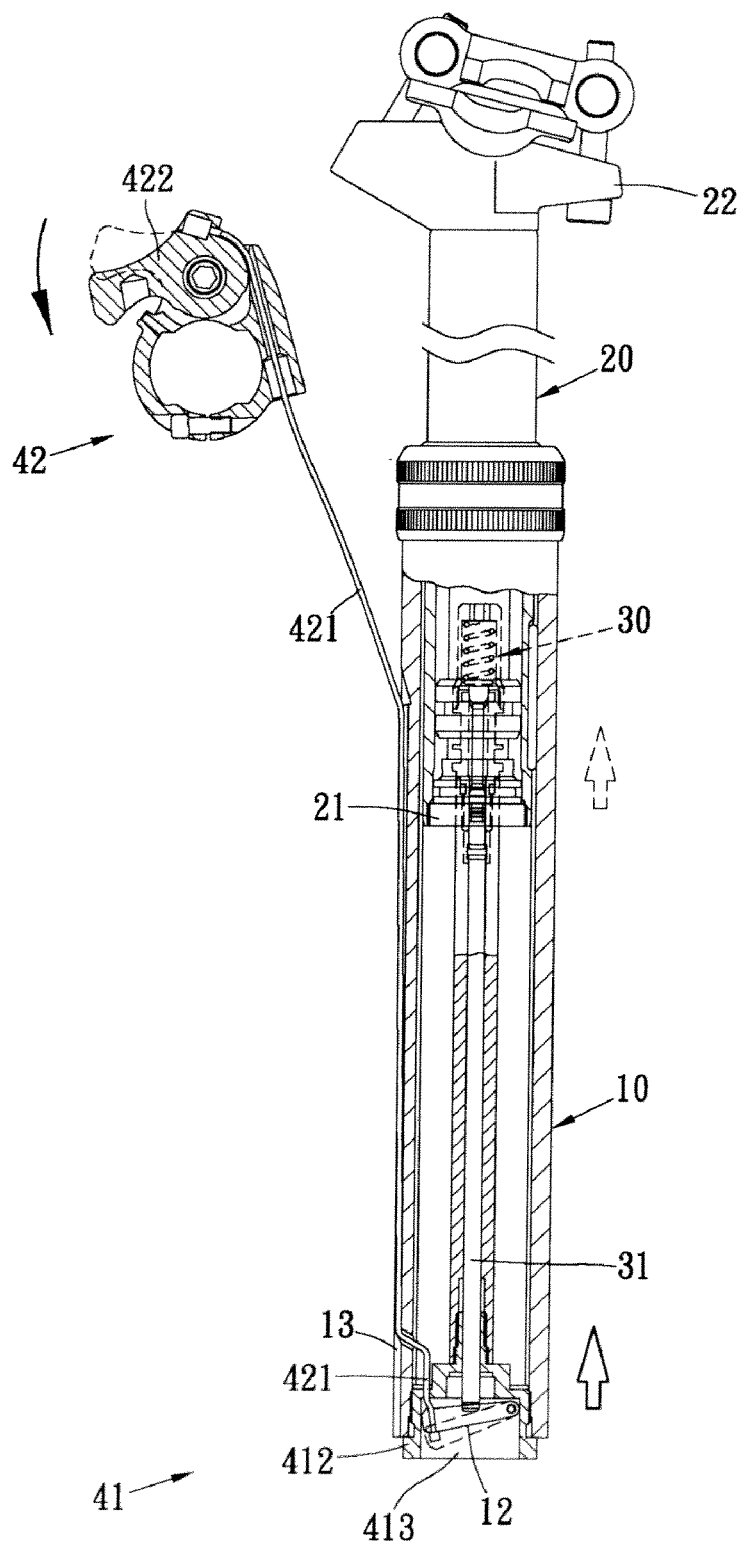
FIG. 8 shows the action status of the bicycle seat adjustable device of the present invention.

As shown in FIG. 8, when adjusting the bicycle seat, the user pivots the switch 422 to pull the cable 421 and the push member 411 is pivoted so that the rod 31 is moved toward the piston seat 21 to open the hydraulic path in the piston seat 21 such that the inner tube 20 is moved linearly relative to the outer tube 10. When the bicycle seat reaches the desired position, the switch 422 is released and the cable 421 is released, the rod 31 is pushed to its original position by the spring in the valve unit 30, and the hydraulic path in the piston seat 21 is closed. The rod 31 pushes the push member 411 back and the inner tube 20 is set relative to the outer tube 10.

The valve unit 30 makes the rod 31 the rod 31 to extend upward and toward the piston seat 21 from the bottom end 12, and this is different from the way of the rod of the conventional adjustable devices. Because the control portion of the valve unit 30 is located at the lower position so as to move the rod 31 up and down, so that the control unit 41 is installed to the bottom end 12 of the outer tube 10.

The control assembly 40 is separated from the valve unit 30 so that the control unit 41 is connected to the rod 31, and cooperated with the action unit 42 via the cable 421. The action unit 42 is not restricted by the position of the rod 31 and the switch 422 can be installed to any position of the bicycle frame 50. The adjustable device includes less number of parts and can be easily and quickly assembled.

The slot 13 provides a space for the cable 421 to extend so that the cable 421 is not shift or disengaged, and the cable 421 is not exposed out form the outer periphery of the outer tube 10. When the outer tube 10 is located in the seat tube 51, there will be not necessary to have a gap between the inner periphery of the seat tube 51 and the outer periphery of the outer tube 10 for the cable 421. This also makes the assembly of the outer tube 10 and the seat tube 51 be easy because the cable 421 is not exposed.

The control unit 41 is installed in the bottom end 12 by the frame 412 with the space 413, the frame 412 seals the lower end of the outer tube 10 to form a room for the hydraulic oil or air, the space 413 also accepts the control unit 41.

The push member 411 is pivotally connected in the space 413 and one side of the push member 411 contacts an end of the rod 31 and the other end of the push member 411 is connected to the cable 421. The cable 421 can be operated by smaller force to move the rod 31.

Figure 9:
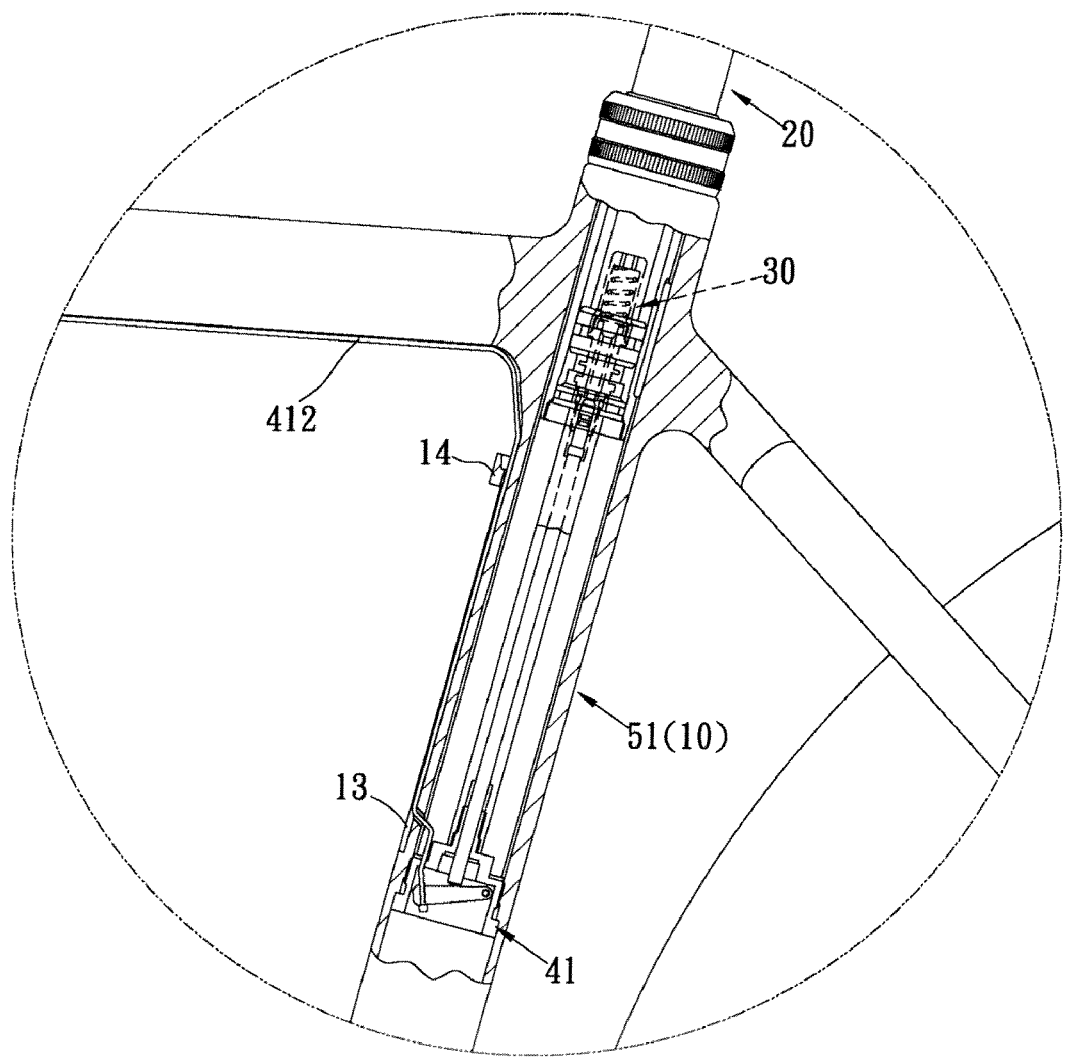
FIG. 9 is a cross sectional view of the second embodiment of the bicycle seat adjustable device of the present invention located in the seat tube of a bicycle.

FIG. 9 shows the second embodiment of the present invention, wherein the outer tube 10 is integrally formed with the seat tube 51 of the bicycle frame 50. The outer tube 10 has a positioning block 14 and the cable 421 extends through the positioning block 14 and is guided by the positioning block 14.

In this embodiment, the seat tube 51 replaces the outer tube 10 and the parts are installed in the seat tube 51, and this embodiment has the same functions as those of the first embodiment.

Figure 10:
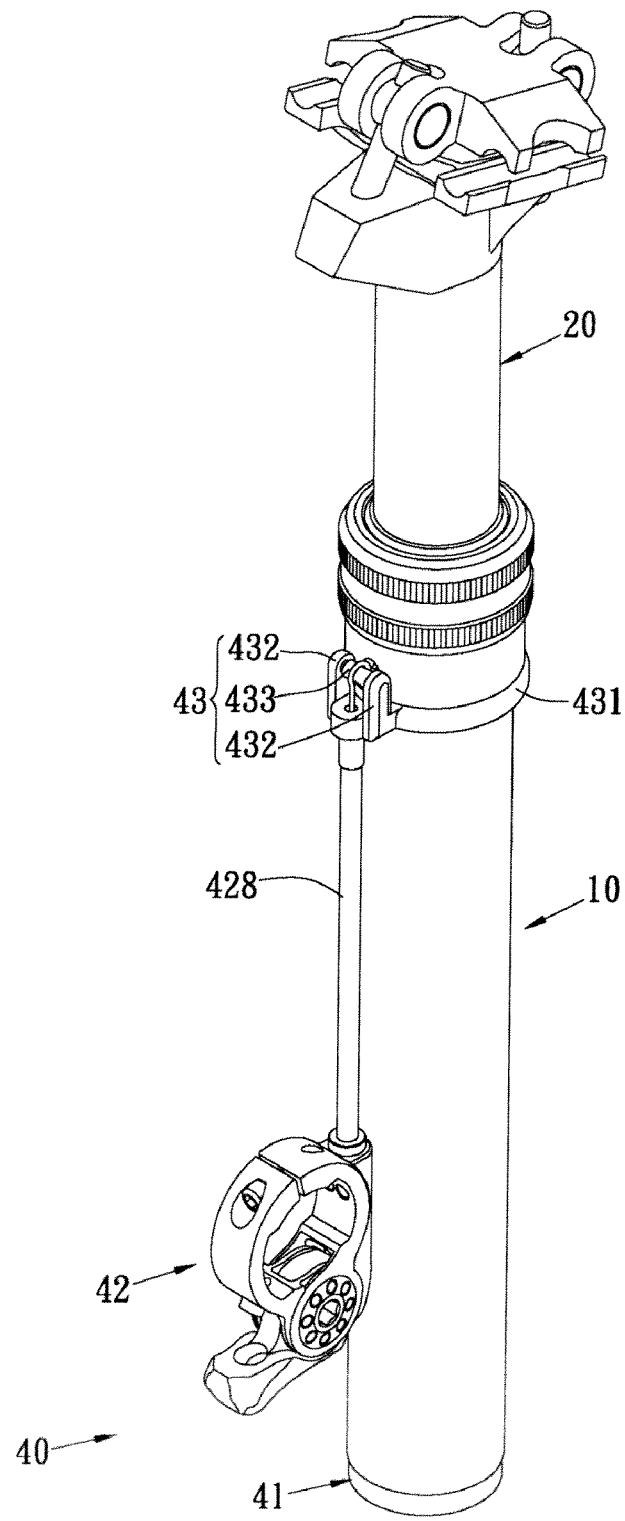
FIG. 10 is a perspective view to show the third embodiment of the bicycle seat adjustable device of the present invention.
Figure 11:
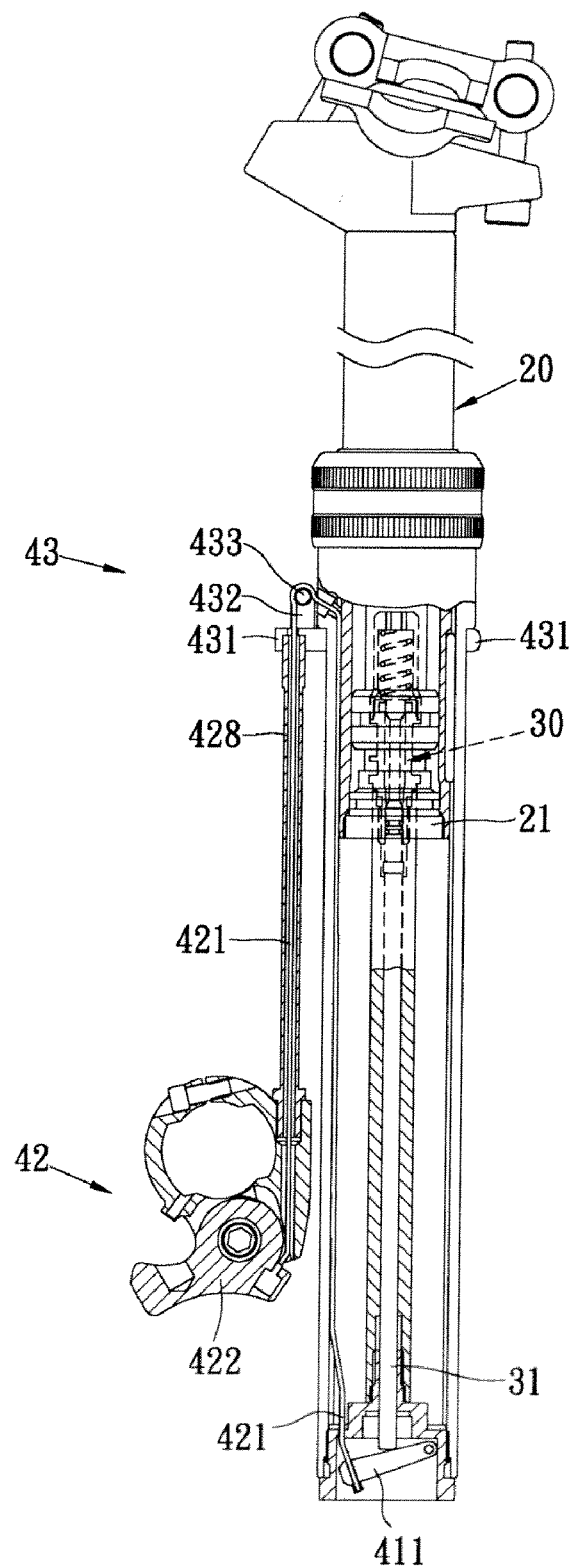
FIG. 11 is a cross sectional view of the third embodiment of the bicycle seat adjustable device of the present invention.

Referring to FIGS. 10 and 11, a third embodiment is disclosed, wherein the control assembly 40 has a positioning unit 43 which is mounted to the outer tube 10 and has an annular portion 431. Two base parts 432 are connected to the annular portion 431 and separated from each other at a distance. A shaft 433 is located between the two base parts 432 and the cable 421 is wrapped to the shaft 433. A sleeve 428 is mounted to the cable 421 that is exposed outside of the outer tube 10.

In this embodiment, the positioning unit 43 is provided and is connected to a pre-set position of the outer tube 10 which does not need to have extra or different shape and structure. The positioning unit 43 guides the cable 421 to wrap correctly and prevents the cable 421 from being shifted.

Besides, the shaft 433 can be a fixed rod or a rod that is pivotable and can spin so as to drive the cable 421. The sleeve 428 protects the cable 421 from the water and dust.

Figure 12:
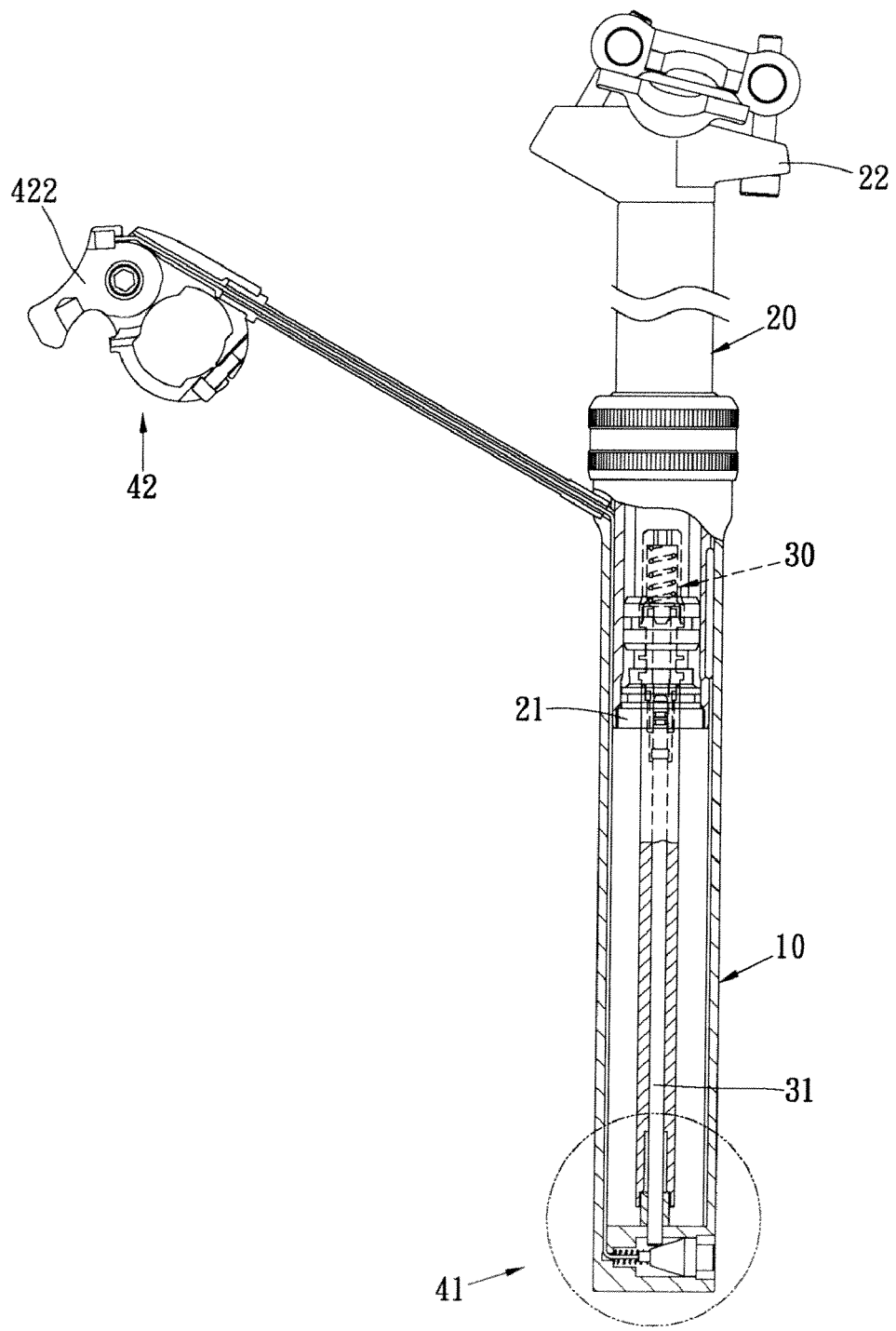
FIG. 12 is a cross sectional view of the fourth embodiment of the bicycle seat adjustable device of the present invention.
Figure 13:
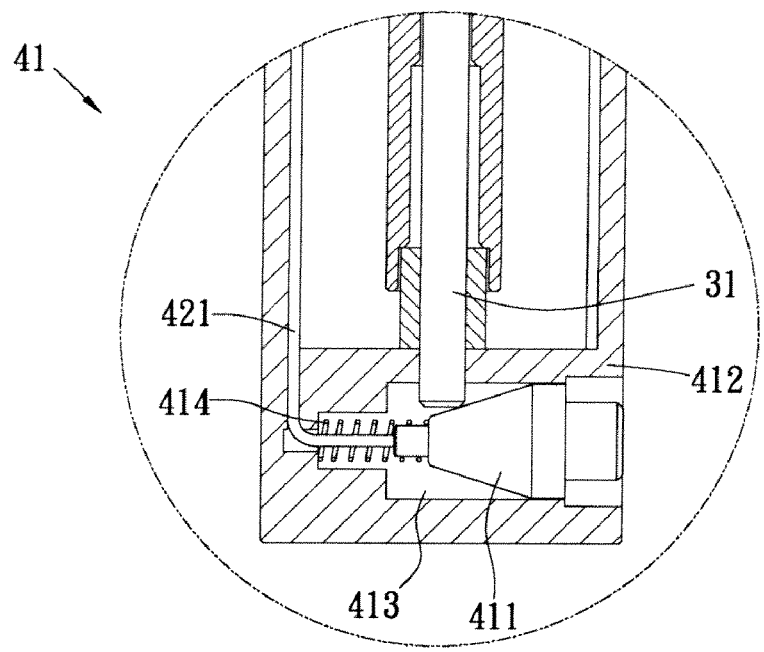
FIG. 13 is an enlarged cross sectional view of the control unit of the fourth embodiment of the bicycle seat adjustable device of the present invention.
Figure 14:
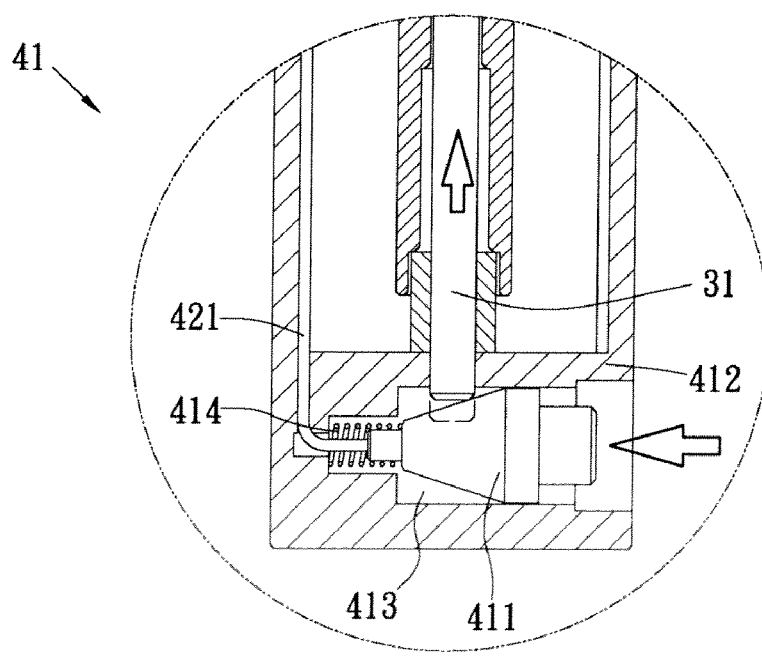
FIG. 14 is an enlarged cross sectional view to show the action of the control unit of the fourth embodiment of the bicycle seat adjustable device of the present invention.

FIGS. 12 to 14 show the fourth embodiment, wherein the control unit 41 has a frame 412 which is integrally formed with the bottom end 12 and the frame 412 has a space 413. The rod 31 extends through the frame 412 and is inserted into the space 413. The push member 411 is cone-shaped member and linearly movable in the space 413. The cable 421 extends through the outer tube 10 and the frame 412 and is located in the space 413 and connected to the push member 411. A spring 414 is located between an inside of the space 413 and the push member 411 so as to provide a force to the push member 411.

The embodiment provides alternative embodiment of the control unit 41 and uses the cone-shaped push member 411 to move the rod 31 toward the piston seat 21 when the push member 411 is linearly moved. When the cable 421 is released, the push member 411 is moved in opposite direction by the spring 414, the rod 31 is moved along the tapered surface of the push member 411 and rod 31 gradually moves toward the space 413.

Figure 15:
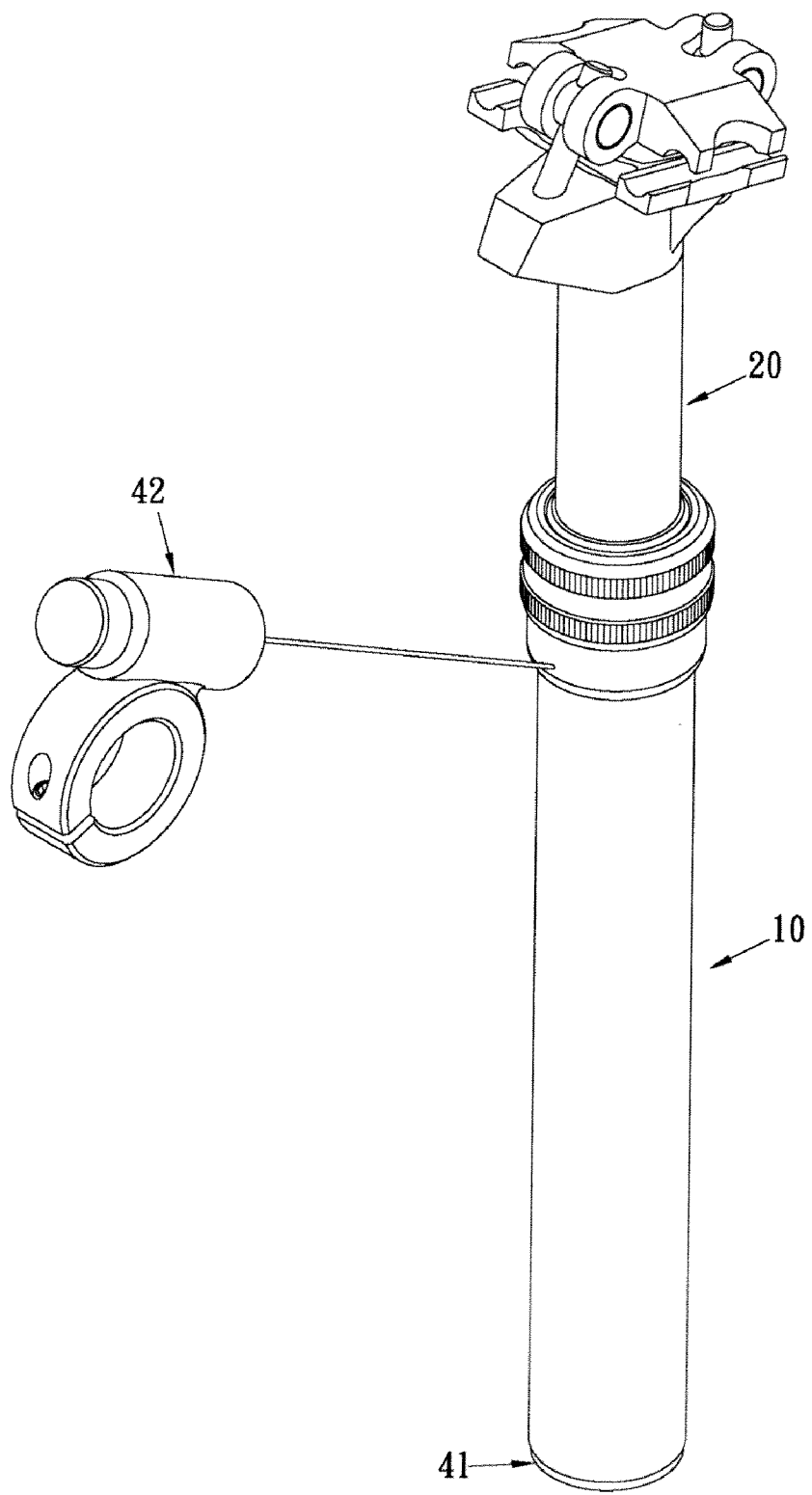
FIG. 15 is a perspective view to show the fifth embodiment of the bicycle seat adjustable device of the present invention.
Figure 16:
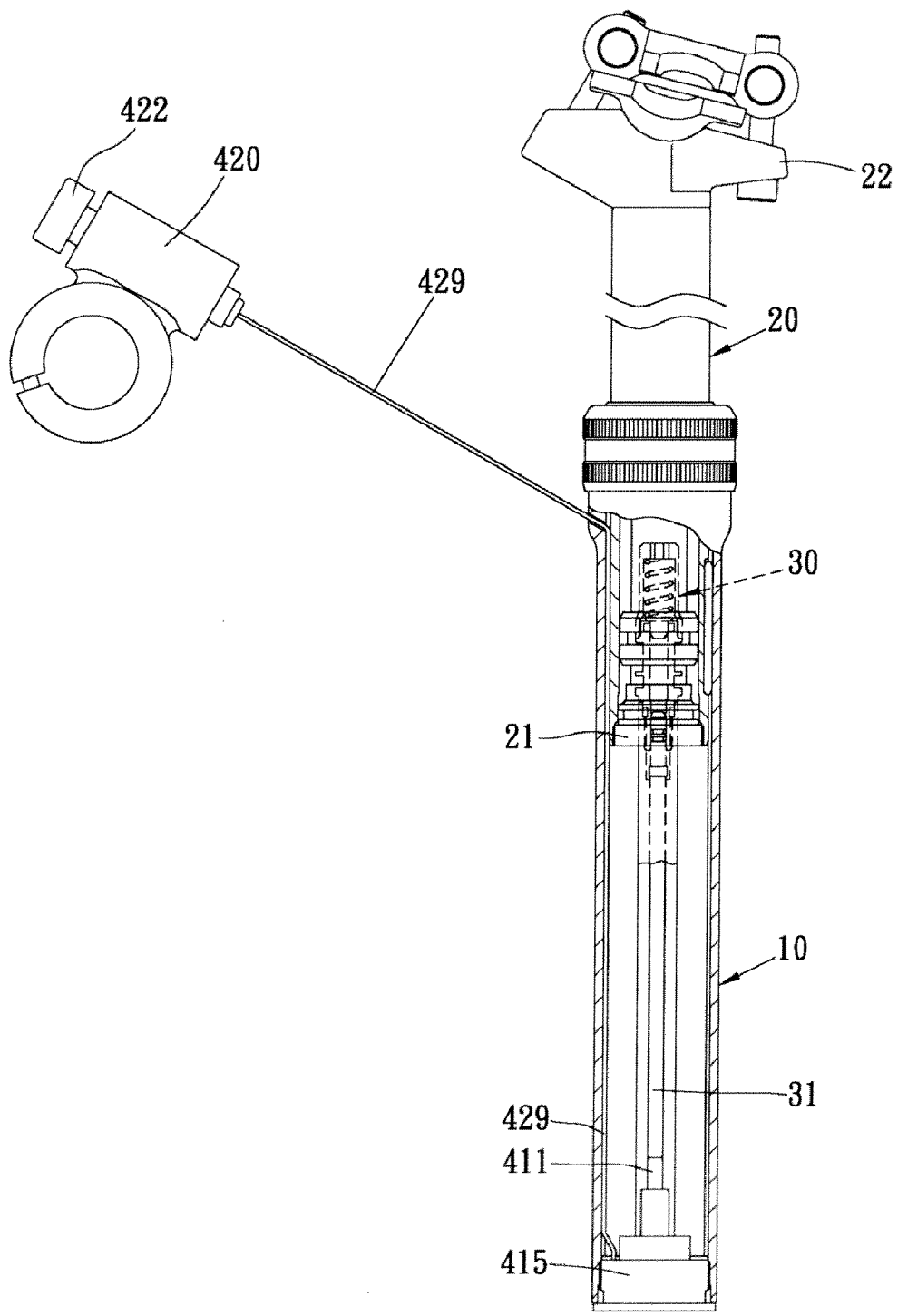
FIG. 16 is a cross sectional view of the fifth embodiment of the bicycle seat adjustable device of the present invention.

FIGS. 15 and 16 show the fifth embodiment of the present invention wherein the control assembly 40 has a control unit 41 connected to the bottom end 12 of the outer tube 10 and an action unit 42 which is located outside of the outer tube 10. The control unit 41 has a push member 411 connected with the rod 31 so as to move the rod 31 linearly. The action unit 42 has an oil hose 429 which extends through the outer tube 10 and is connected to the push member 411. A distal end of the oil hose 429 is connected to a switch 422. The push member 411 is indirectly moved so as to move the rod 31 to control the hydraulic path in the piston seat 21 by controlling hydraulic liquid in the oil hose 429.

The control unit 41 has a control cylinder 415 fixed to the bottom end 12 and connected to the push member 411. The control cylinder 415 drives the push member 411 to move linearly by hydraulic force. The oil hose 429 extends through the outer tube 10 and is inserted into the bottom end 12 so as to be connected to the control cylinder 415 which is controlled by the action unit 42 to indirectly move the push member 411 linearly. The rod 31 is in contact with an end of the push member 411 which moves the rod 31. The action unit 42 has an action cylinder 420 located between the switch 422 and the oil hose 429 so as to control hydraulic oil in the oil hose 429 to flow to the control cylinder 415 to indirectly move the push member 411 and linearly move the rod 31.

The action unit 42 and the control unit 41 of the embodiment can be operated by hydraulic oil and perform the same functions as those in the previous embodiments. The action unit 42 and the control unit 41 of the embodiment can also be operated in pneumatic or mechanical adjustable devices.

Figure 17:
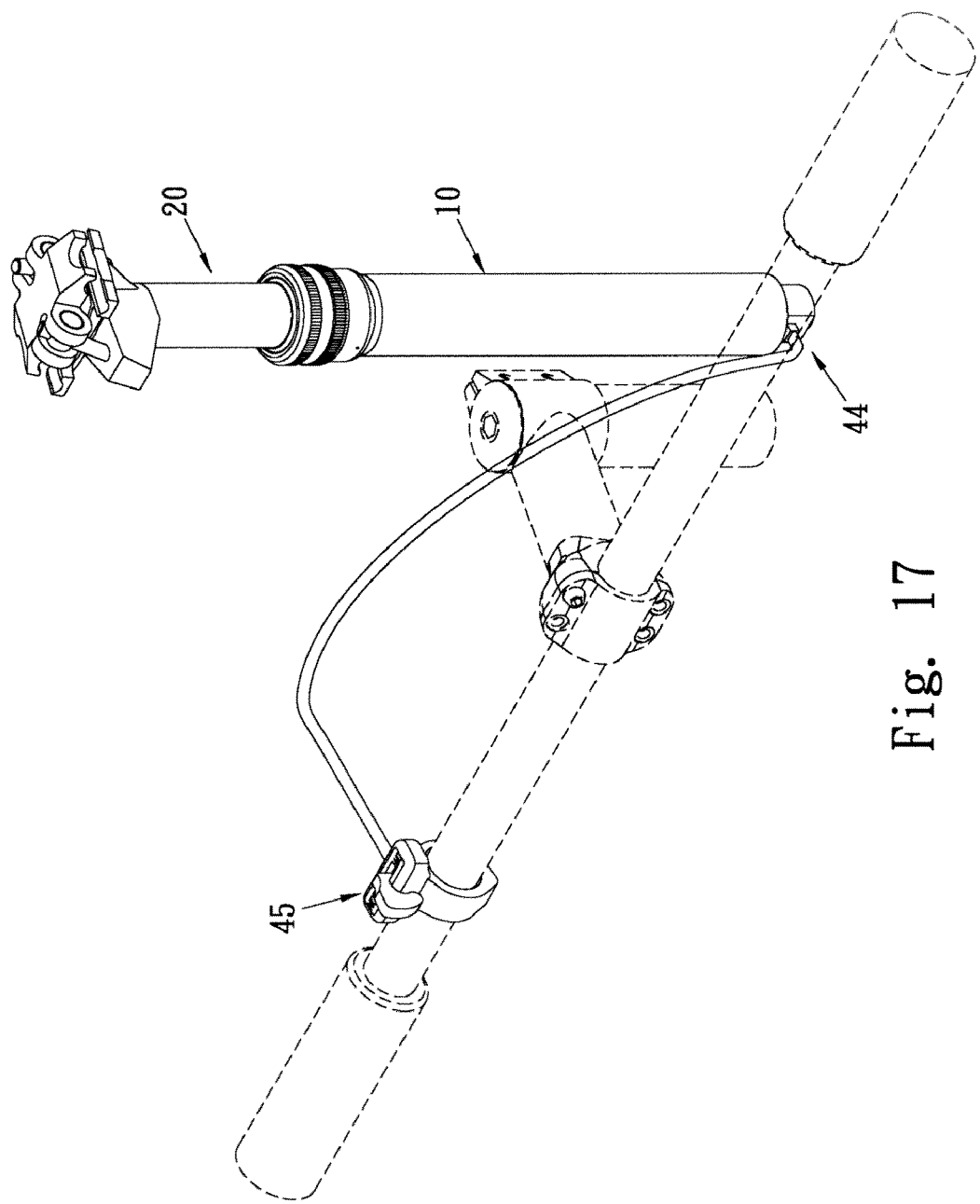
FIG. 17 is a perspective view to show the sixth embodiment of the bicycle seat adjustable device of the present invention.
Figure 18:
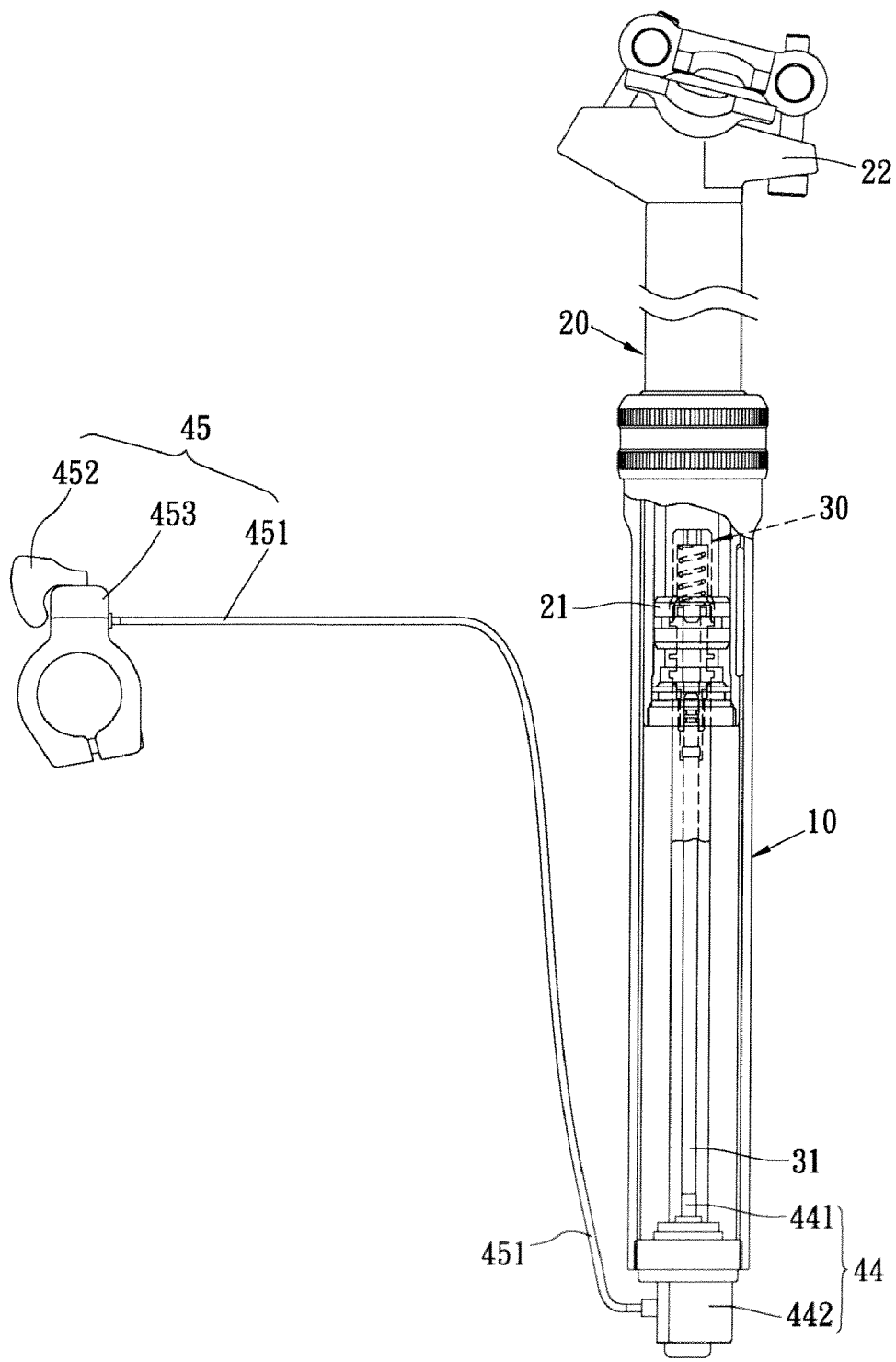
FIG. 18 is a cross sectional view of the sixth embodiment of the bicycle seat adjustable device of the present invention.

FIGS. 17 and 18 show the sixth embodiment, wherein the control assembly 40 has an electric control valve unit 44 connected to the bottom end 12 of the outer tube 10 and an action unit 45 which is located outside of the outer tube 10. The electric control valve unit 44 has a push member 411 connected with the rod 31 so as to move the rod 31 linearly. The action unit 45 has an electric wire 451 which extends through the outer tube 10 and is connected to the push member 411. A distal end of the electric wire 451 is connected to a switch 452 so as to control the electric wire 451 and indirectly push the push member 411 to move the rod 31 linearly and control hydraulic path in the piston seat 21 by the electric control valve unit 44.

The electric control valve unit 44 has an electric control member 442 fixed in the bottom end 12 and connected to the push member 441. The electric control member 442 drives the push member 441 linearly by way of electro-magnetic force. The electric wire 451 extends through the outer tube 10 and is located in the bottom end 12 so as to be connected to the electric control member 442 which is controlled by the action unit 45 and indirectly drives the push member 441 linearly. The rod 31 is in contact with one end of the push member 441 and pushed by the push member 441. The action unit 45 has an action member 453 located between the switch 422 and the electric wire 452 so as to transfer the electro-magnetic force in the electric wire 451 to the electric control member 442 to indirectly move the push member 441 and the rod 31.

The action unit 45 and the electric control valve unit 44 of the embodiment can be used with any type of adjustable devices and perform the same functions.

While we have shown and described the embodiment in accordance with the present invention, it should be clear to those skilled in the art that further embodiments may be made without departing from the scope of the present invention. —

What is claimed is:

1. A bicycle seat adjustment device comprising:
an outer tube (10) having a top end (11) and a bottom end (12);
an inner tube (20) inserted into the outer tube (10) via the top end (11) of the outer tube (10), the inner tube (20) having a piston seat (21) and a clamp unit (22) on two ends thereof;
a valve unit (30) extending through the piston seat (21) and located in the inner tube (20), the valve unit (30) comprising a rod (31) extending through the piston seat (21) and reaching the bottom end (12), the rod displaceably engaging to alternatively seal and unseal a flow path through the piston seat (21), and
a control assembly (40) having a control unit (41) connected to the bottom end (12) of the outer tube (10) and an action unit (42) located outside of the outer tube (10), the control unit (41) having a push member (411) engaging the rod (31) to move the rod (31) linearly, the action unit (42) remotely controlling the push member by a cable (421) extending along a sidewall of the outer tube (10) to the bottom end thereof, a distal end of the cable (421) connected to a switch (422), the push member (411) being remotely actuated responsive to the switch to move the rod (31) for selectively controlling the flow path through the piston seat (21) to alternatively release and lock the bicycle seat in adjusted position.

2. A bicycle seat adjustment device comprising:
an outer tube (10) having a top end (11) and a bottom end (12);
an inner tube (20) inserted into the outer tube (10) via the top end (11) of the outer tube (10), the inner tube (20) having a piston seat (21) and a clamp unit (22) on two ends thereof;
a valve unit (30) extending through the piston seat (21) and located in the inner tube (20), the valve unit (30) comprising a rod (31) extending through the piston seat (21) and reaching the bottom end (12), the rod displaceably engaging to alternatively seal and unseal a flow path through the piston seat (21), and
a control assembly (40) having a control unit (41) connected to the bottom end (12) of the outer tube (10) and an action unit (42) located outside of the outer tube (10), the control unit (41) having a push member (411) engaging the rod (31) to move the rod (31) linearly, the action unit (42) remotely controlling the push member by an oil hose (429) extending along a sidewall of the outer tube (10) to the bottom end thereof, a distal end of the oil hose (429) connected to a switch (422), the push member (411) being remotely actuated responsive to the switch to move the rod (31) for selectively controlling the flow path through the piston seat (21) to alternatively release and lock the bicycle seat in adjusted position.

3. A bicycle seat adjustment device comprising:
an outer tube (10) having a top end (11) and a bottom end (12);
an inner tube (20) inserted into the outer tube (10) via the top end (11) of the outer tube (10), the inner tube (20) having a piston seat (21) and a clamp unit (22) on two ends thereof;
a valve unit (30) extending through the piston seat (21) and located in the inner tube (20), the valve unit (30) comprising a rod (31) extending through the piston seat (21) and reaching the bottom end (12), the rod displaceably engaging to alternatively seal and unseal a flow path through the piston seat (21), and
a control assembly (40) having an electric control valve unit (44) connected to the bottom end (12) of the outer tube (10) and an action unit (45) located outside of the outer tube (10), the electric control valve unit (44) having a push member (411) engaging the rod (31) to move the rod (31) linearly, the action unit (45) remotely controlling the push member by an electric wire (451) extending along a sidewall of the outer tube (10) to the bottom end thereof, a distal end of the electric wire (451) connected to a switch (452) so as to control the electric wire (451) and remotely actuate the push member (411) responsive to the switch to move the rod (31) linearly for controlling the hydraulic flow path through the piston seat (21) to alternatively release and lock the bicycle seat in adjusted position.

4. The device as claimed in claim 1, 2 or 3, wherein the outer tube (10) is integrally formed with a bicycle frame (50).

5. The device as claimed in claim 1, 2 or 3, wherein the outer tube has a slot (13) defined axially in outer surface thereof.

6. The device as claimed in claim 1, 2 or 3, wherein the action unit (42) has a securing init (423) comprising a pin (424) and two parts (425, 426), the two parts (425, 426) forming a clamping space (427) so as to be connected to the bicycle frame, the switch (422) is pivotably connected to the two parts (425, 426).

7. The device as claimed in claim 1, 2 or 3, wherein the action unit (42) is coupled to a positioning unit (43) mounted to the outer tube; the positioning unit including an annular portion (431), two base parts (432) connected to the annular portion (431) and separated from each other, and a shaft (433)

located between the two base parts (432), and the cable (421) extending about the shaft (433).

8. The device as claimed in claim 1, wherein the control unit (41) has a frame (412) fixed in the bottom end (12) and the frame (412) has a space (413), the rod (31) extends through the frame (412) and is inserted into the space (413), the push member (411) is an elongate rod pivotably disposed in the space (413), the cable (421) extends through the outer tube (10) and the frame (412) and is located in the space (413) connected to the push member (411).

9. The device as claimed in claim 1, wherein the control unit (41) has a frame (412) integrally formed with the bottom end (12) and the frame (412) has a space (413), the rod (31) extends through the frame (412) and is inserted into the space (413), the push member (411) is a cone-shaped member and linearly movable in the space (413), the cable (421) extends through the outer tube (10) and the frame (412) and is located in the space (413) connected to the push member (411), a spring (414) is located inside the space (413) to bias the push member (411).

10. The device as claimed in claim 1, wherein a sleeve (428) covers a portion of the cable (421) outside of the outer tube (10).

11. The device as claimed in claim 2, wherein the control unit (41) has a control cylinder (415) fixed to the bottom end (12) and connected to the push member (411), the control cylinder (415) drives the push member (411) to move linearly by hydraulic force, the oil hose (429) extends through the outer tube (10) and is inserted into the bottom end (12) to be connected to the control cylinder (415) controlled by the action unit (42) to indirectly move the push member (411) linearly, the rod (31) is in contact with an end of the push member (411).

12. The device as claimed in claim 2, wherein the action unit (42) has an action cylinder (420) located between the switch (422) and the oil hose (429) to control hydraulic oil in the oil hose (429) to flow to the control cylinder (415) to indirectly move the push member (411) and linearly move the rod (31).

13. The device as claimed in claim 3, wherein the electric control valve unit (44) has an electric control member (442) fixed in the bottom end (12) and connected to the push member (441), the electric control member (442) drives the push member (441) linearly by way of electro-magnetic force, the electric wire (451) extends through the outer tube (10) and is located in the bottom end (12) to be connected to the electric control member (442) controlled by the action unit (45) and indirectly drives the push member (441) linearly, the rod (31) is in contact with one end of the push member (441) and pushed by the push member (441).

14. The device as claimed in claim 3, wherein the action unit (45) has an action member (453) located between the switch (422) and the electric wire (452) to transfer the electro-magnetic in the electric wire (451) to the electric control member (442) to indirectly move the push member (441) and the rod (31).

* * * * *